S. DARLING.
Weighing Apparatus.
No. 44,611.
Patented Oct. 11, 1864.
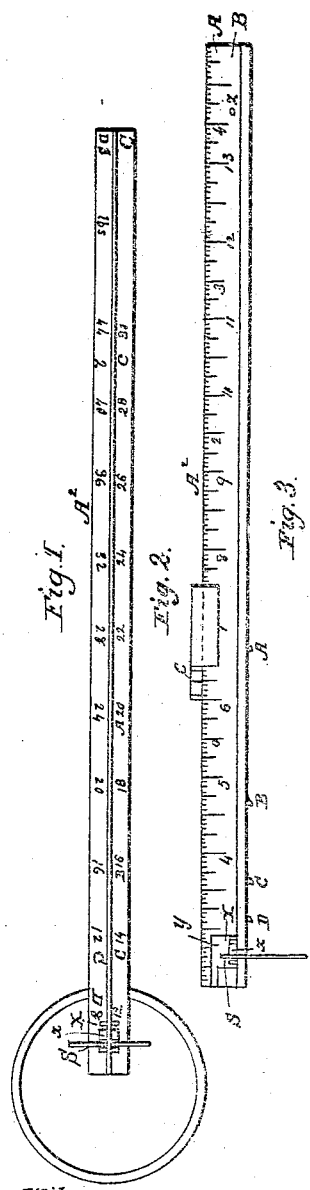
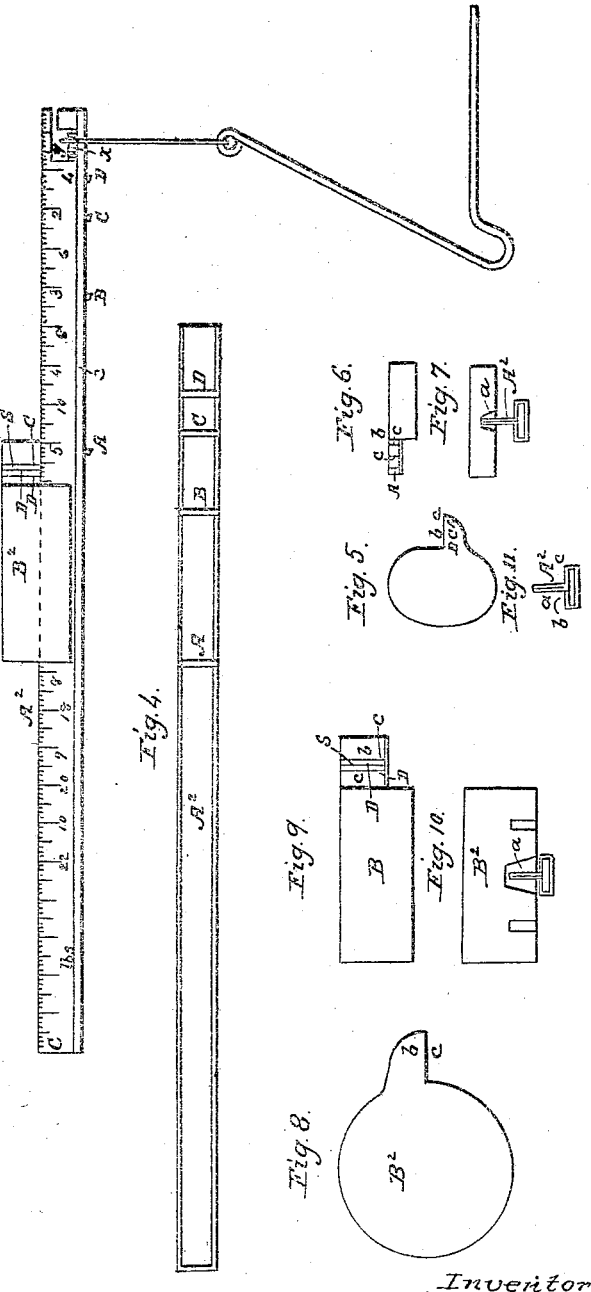

UNITED STATES PATENT OFFICE.

SAMUEL DARLING, OF BANGOR, MAINE.

IMPROVEMENT IN WEIGHING APPARATUS.

Specification forming part of Letters Patent No. 44,611, dated October 11, 1864.

*To all whom it may concern:*

Be it known that I, SAMUEL DARLING, a resident of Bangor, in the county of Penobscot and State of Maine, have invented an Improved Apparatus for Weighing; and I do hereby declare the same to be fully described in the following specification and represented in the accompanying drawings, of which—

Figure 1 is a top view. Figs. 2 and 3 are opposite side elevations; Fig. 4, an under side view. Fig. 5 is a top view, and Fig. 6 a side elevation, and Fig. 7 a transverse section, of the two ounce weight, and with the beam of the said weighing apparatus. Figs. 8, 9, and 10 are similar views of the one-pound weight of such apparatus. Fig. 11 is a cross section of the scale-beam.

This weighing apparatus consists of a scale-beam, $A^2$, a sliding weight, $B^2$, and a "hod" or its equivalent for supporting an article to be weighed, the nature of my invention or improvements being found in the construction of the said beam and the weight, and in the arrangement of a series of scales or divisions, and a series of fulcra, the whole being as hereinafter described. The scale-beam may be about twelve inches in length, and of the sectional form as exhibited in Fig. 11, in which is shown a thin bar, $a$, provided with two flanges, $b\ c$, extending from it. The whole may be made of sheet metal, bent into the requisite form, and for such purpose tinned sheet-iron may be employed to good advantage, as it will be of sufficient strength, and will readily admit of the fulcra-bars, as well as the part for sustaining the hod being fixed in their places, in part, by the aid of solder applied to them and the beam. The beam is to be divided along the upper part of each side of it into divisional parts of one-sixteenth of an inch each, this being marked and numbered, as shown in Figs. 2 and 3. Furthermore, the beam is provided with four fulcra or pivots, (marked A B C D in Figs. 2, 3, and 4,) each of such fulcra being a steel bar, extended across and projecting below the bottom surface of the beam, and having its lower edge beveled, as shown in the figures. One side of the beam may be marked " Oz.," and the other side "Lbs.," the smaller or two-ounce weight being applicable to the scales on one side, or that marked "Oz.," the larger or pound weight being for the scales of the other side. On either side of the beam are three rows of figures, which are to indicate the scales for the different fulcra. Those on the side marked "Oz." denote the weight in ounces when the fulcra A B C are used with the two-ounce weight—that is, the upper row is used for the fulcrum A, the middle row for the fulcrum B, and the lowest row, or that on the flange, is employed when the fulcrum C is used. The fulcra letters are also stamped in the beam and against the rows of figures, to be used with the different fulcra indicated by such letters. On the opposite side of the beam, or that marked "Lbs.," the fulcra C D only are to be used with the pound-weight, the fulcrum D being employed when the hod is supported from the notch S, which requires a separate row of figures. In all other cases the hod is to be suspended from the notch X, the said two notches being formed in a saddle-bar, $x$, arranged at the lower part of an opening, $y$, made at one end of the beam in manner as shown in the drawings. The uppermost row of figures on the last-mentioned side of the beam shows the weights in pounds when the fulcrum C is used for supporting the beam. The middle row of figures on such side represents the weights in pounds when the fulcrum D is used, and finally the lowest row of figures, or that on the flange of such side, shows the weights in pounds when the fulcrum D is used and the hod is suspended from the notch S. When either of the beam-weights is used, its arm or projection should be arranged so as to be between the saddle-bar $x$ and the rest of the weight. Each of the said weights is constructed with a groove, $a$, formed across it to enable the weight to straddle and be slid on the upper part of the beam. The said weight also has an index-arm, $b$, extending from it, and so as to project over the upper edge of the beam and have the index-face $c$ of the arm in the same plane with the side of the beam on which are the divisions for the indices of the said arm. The vertical index-face of the arm is to be marked with three indices or vertical lines, one for each fulcrum with which the weight is intended to be used, the mark for each fulcrum being denoted by a letter corresponding to that of the said fulcrum. When the mark stamped A on the arm of the two ounce weight is directly over the longer mark, stamped o on the beam, the scale—that is, the hod and beam—will balance on the fulcrum A; so when the mark stamped B on the weight arm is directly over the longer mark, stamped 4 in the middle row of figures of the beam side marked A B, the weight will be four ounces, the beam being supposed to rest on the fulcrum B.

In using the scale the beam may be placed on a table, or on any support from whence the hod can hang freely from the beam, the fulcrum to be used being arranged near to the edge of the table or support. The fulcrum A, I arrange at four inches from the notch X. The fulcrum B is two inches from such notch, the fulcrum C being one inch, and the fulcrum D being one-half an inch from the said notch.

The advantages of this scale are to be found in its portability and its cheapness of construction, as very light as well as much heavier bodies may be weighed by it with great accuracy.

I claim—

1. The improved scale-beam as made with a series of separate fulcra and scales of divisions arranged therewith, and to be used with one or more movable weights and a hod or its equivalent, substantially as explained.

2. The movable beam weight as made with the index-arm, and so as to straddle and be capable of sliding on the beam, as specified.

3. With the scale-beam as made with a series of separate fulcra and scales of divisions, as described, the construction of the saddle-box x with the two notches X S, the same to be used in manner and for the purpose as specified.

SAMUEL DARLING.

Witnesses:
ISAIAH STETSON,
ALBERT W. PAINE.